United States Patent [19]

Clausen

[11] Patent Number: 5,420,737
[45] Date of Patent: May 30, 1995

[54] CLEANING APPARATUS FOR A TAPE DRIVE MACHINE WITH A MECHANISM TO SELECT BETWEEN A CAPSTAN CLEANING CONFIGURATION AND A HEAD CLEANING CONFIGURATION

[75] Inventor: Eivind Clausen, Bellingham, Wash.
[73] Assignee: Allsop, Inc., Bellingham, Wash.
[21] Appl. No.: 259,962
[22] Filed: Jun. 14, 1994
[51] Int. Cl.⁶ ............................................... G11B 5/10
[52] U.S. Cl. .................................................... 360/128
[58] Field of Search .......................................... 360/128

[56] References Cited

U.S. PATENT DOCUMENTS

| | | |
|---|---|---|
| 3,655,924 | 4/1972 | Puskas . |
| 3,761,994 | 10/1973 | Becht . |
| 3,783,470 | 1/1974 | Myers et al. . |
| 3,976,262 | 8/1976 | Kennedy . |
| 4,141,053 | 2/1979 | Kara . |
| 4,272,796 | 6/1981 | Van Kreuningen et al. . |
| 4,510,545 | 4/1985 | Boudreau . |
| 4,599,669 | 7/1986 | Meermans . |
| 4,616,283 | 10/1986 | Clausen et al. . |
| 4,631,616 | 12/1986 | Zago et al. . |
| 4,763,216 | 8/1988 | Solhjell et al. . |
| 4,775,910 | 10/1988 | Rudi . |
| 4,816,952 | 3/1989 | Clausen . |
| 4,875,125 | 10/1989 | Joannou et al. . |
| 4,894,743 | 1/1990 | Clausen . |
| 4,941,065 | 7/1990 | Fritsch . |

FOREIGN PATENT DOCUMENTS

| | | |
|---|---|---|
| 58-100254 | 6/1983 | Japan . |
| 2090226 | 7/1982 | United Kingdom . |
| 2239731 | 10/1991 | United Kingdom . |

Primary Examiner—A. J. Heinz
Attorney, Agent, or Firm—Christensen, O'Connor, Johnson & Kindness

[57] ABSTRACT

A cleaning cassette for cleaning a tape drive unit having a capstan and a read/write head is disclosed. The cleaning cassette includes a housing, a reciprocating head cleaner, and a capstan cleaner. The housing is arranged and configured to be received within the tape drive unit. The housing has a forward side to oppose the capstan and head once the cleaning cassette is placed within the unit, and a rearward side opposite the forward side. The reciprocating head cleaner is coupled within the housing and includes a drive mechanism that is engageable with the capstan of the drive unit. The capstan cleaner is also engageable with the capstan of the drive unit and is coupled to the housing. The capstan cleaner includes a capstan-cleaning element and a cleaning activation mechanism. The cleaning activation mechanism is for selecting a capstan-cleaning configuration, wherein the capstan-cleaning element abuts the capstan, or a head-cleaning configuration wherein the drive mechanism engages the capstan.

20 Claims, 4 Drawing Sheets

CLEANING APPARATUS FOR A TAPE DRIVE MACHINE WITH A MECHANISM TO SELECT BETWEEN A CAPSTAN CLEANING CONFIGURATION AND A HEAD CLEANING CONFIGURATION

FIELD OF THE INVENTION

The present invention relates to an apparatus for cleaning a tape drive machine and, more particularly, to an apparatus adapted for cleaning a read and/or write head and drive capstan of a machine, such as a tape drive, that is adapted to operate on a tape cassette containing a magnetic tape.

BACKGROUND OF THE INVENTION

There are various machines that operate to receive information from, or impart information to, magnetic tape. Two such commonly used machines are video player/recorder units and audio player/recorder units. In the video units, the magnetic tape is pulled outwardly from a cassette tape cartridge and brought into engagement with a shallow cylindrical surface of a rotating element on which the player/recorder head is carried. In the audio unit, the magnetic tape generally extends across a forward portion of the tape cassette, with the tape being exposed at this forward portion. The tape passes by a stationary player/recorder head, and is also engaged by a capstan and pinch roller of the machine to cause the tape to move along its length.

Various cleaning devices have been proposed to clean the operating surfaces of such player/recorder units. With the video unit, it has been a common practice to provide a cleaning ribbon that is engaged by guide elements in the video player/recorder unit to carry the cleaning ribbon into engagement with the rotating element carrying the player/recorder head and possibly into engagement with other components of the video player/recorder unit.

Another type of cleaning mechanism that is used more commonly with audio player/recorder units comprises a cassette housing that carries a cleaning member that in turn is adapted to carry a cleaning element, such as a pad. This cleaning member is arranged to move on a cleaning path, which in many cleaning devices is a back-and-forth path where it wipes against the player/recorder head of the audio unit. Quite commonly, the cleaning member is driven on its back-and-forth path through a suitable drive transmission from one of the drive spindles in the audio player/recorder unit.

To obtain the proper cleaning action, it is desirable to have adequate frictional engagement between the cleaning pad and the surface of the player/recorder head of the audio unit. However, if the force of the frictional engagement is excessive, then the resistance imparted back through the drive transmission to the drive sprocket may trigger the automatic shutoff mechanism in the machine.

Another concern is that the operating surface of the player/recorder head is quite often not a flat surface, but a moderately curved surface. Also, in some instances, the operating surface of the head may be a compound curved surface, having two or more curved side portions, with a moderate recess between the curves, or with ridges and small crevices. This may have a tendency to create a resisting force against the cleaning pad greater than that that would normally be encountered simply from frictional engagement.

Another consideration is that the location of the player/recorder head will vary from machine to machine. Thus, the cleaning element (i.e., usually the cleaning pad) must be mounted in such a way that it can be positioned at different forward-to-rear locations and still be in proper cleaning engagement with the player/recorder head.

One common means of mounting the cleaning element is to place it on an arm that is pivotally mounted for back-and-forth motion about a pivot location in the center portion of the cassette housing. To accommodate different forward-to-rear locations of the cleaning element, there is sometimes provided a spring arm, which in one form can be a U-shaped spring section, such as shown in U.S. Pat. No. 4,225,893 (Loiselle). This patent shows another method of accommodating this difference in forward-to-rear location of the cleaning element. The lever arm itself is secured with a pin-and-slot connection so that it can shift forwardly or rearwardly as the pivot arm swings back and forth about the pivot location to accomplish the cleaning motion on the surface of the head. A spring biases the arm in a forward direction.

With regard to the problem of the cleaning element being caught or snagged on the surface of the player/recorder head (e.g., possibly being engaged by a side surface portion of the head so as to create a relatively large resistance to the back-and-forth movement of the cleaning element), one approach to this problem, as shown in U.S. Pat. No. 4,454,551 (Clausen et al.), is to provide the arm that carries the cleaning pad with a spring having a somewhat "Z" configuration, where the spring has two oppositely positioned U-shaped spring sections.

In yet other instances, the cleaning element is mounted to a carder that, instead of a pivot motion, has a linear side-to-side motion, with the carrier or carriage for the cleaning pad having a laterally extending member mounted between pins. An example of this is shown in U.S. Pat. No. 4,442,468 (d'Alayer de Costemore d'Arc).

Other pans of both video and audio player/recorder units also need cleaning besides the play/record heads. Foreign particles, such as oxidation from magnetic tapes and dust, accumulate on drive capstans and pinch rollers as well as heads. Such pollution may cause the player and/or recorder units to lose proper drive control of the tape. Problems of tape speed, jamming, and other erratic behavior can result. Attempts have thus been made to clean elements, such as capstans and pinch rollers, in addition to the heads. An example of a capstan and pinch roller cleaner is shown in U.S. Pat. No. 4,454,550 (Clausen et al.). The cleaning cassette disclosed therein includes a cleaning arm for the head, which is driven by drive spindles of the player/recorder unit, and a cleaning cartridge for the capstan and pinch roller.

In addition to video and audio player/recorder units, there are also tape drives that move a magnetic tape relative to a read/write head so that data can be taken from the tape or transmitted to the tape. Common drives are provided a read/write head that is positioned at a front location relative to the tape cassette, and the operating surface of this head has a pair of vertically oriented ridges that protrade outwardly from the operating surface a short distance. With regard to cleaning such a read/write head, for example by a back-and-forth motion of a pad, these ridges aggravate the problem of the cleaning pad encountering an excessive resisting force by the pad coming into engagement with the side surfaces of these ridges.

In this tape drive machine, there is a drivewheel (i.e., a capstan) that engages a drive element in the tape cassette to cause movement of the tape. The operation of the machine is such that the motion imparted to the tape is a somewhat erratic back-and-forth motion.

In U.S. Pat. No. 4,816,952 (Clausen) there is described a cassette cleaner to clean the read/write head of the tape drive machine. There is a cassette housing having a carriage mounted for lateral back-and-forth movement in the housing. The carriage has a slot-and-pin mounting at a left forward location, and a cleaning pad at a right forward location, with a gear and cam transmission to cause the lateral back-and-forth motion of the carriage. Power to the gear and cam transmission is supplied by a drivewheel 78 that engages a roller or drive capstan 16, which is a component of the tape drive machine.

While the cassette cleaner described in U.S. Pat. No. 4,816,952 cleans the read/write head, there is still the problem of cleaning the capstan or drive roller of the tape drive machine. Also, as the drive units seem to have faster and faster drives, additional problems of cleaning-cassette noise and excessive speed of the head-cleaning pad emerge. The gear-driven system disclosed causes disconcerting noises in high-speed drives. Also, if the speed of the head-cleaning pad is too high, it will not effectively clean the irregular surface of the head.

The main impediment to cleaning the capstan of a tape drive unit, such as that discussed above, is the arrangement of the standard drive such that the sole driving element of the unit is the capstan. Thus, the cleaning cassette drive mechanism to clean the head must engage the capstan and no adequate access to the capstan remains for cleaning of the capstan itself, which, as discussed above, also becomes polluted.

One solution to the capstan-cleaning problem in tape drive units was made by the present inventor and disclosed in U.S. Pat. No. 4,894,743. The disclosed cleaning cassette utilizes separate replaceable cleaner/drive members, one for providing driving engagement with the capstan to move a head cleaner pad and a second providing a capstan-cleaning pad and no driving engagement.

However, the system of U.S. Pat. No. 4,894,743 requires separate members that may be misplaced or not used. The system also relies on a gear-driven transmission that may be noisy, especially with high-speed drives. The system also may not provide enough speed reduction for high-speed drives, such that the head may not be effectively cleaned.

Therefore, owing to the drawbacks of the above-described cleaning devices, particularly in meeting the requirements of tape drive units where a capstan provides the sole driving force, the present invention was developed. The present invention effectively cleans both the head and capstan without separate parts or members and reduces head cleaner speed and drive transmission noise.

SUMMARY OF THE INVENTION

A cleaning cassette for cleaning a tape drive unit having a capstan and a read/write head is provided. The cleaning cassette includes a housing, a reciprocating head cleaner, and a capstan cleaner. The housing is arranged and configured to be received within the tape drive unit. The housing has a forward side to oppose the capstan and head once the cleaning cassette is within the unit, and a rearward side opposite the forward side. The reciprocating head cleaner is coupled within the housing and includes a drive mechanism that is engageable with the capstan of the drive unit. The capstan cleaner is also engageable with the capstan of the drive unit and is coupled to the housing. The capstan cleaner includes a capstan-cleaning element and a cleaning activation mechanism. The cleaning activation mechanism is for selecting a capstan-cleaning configuration, wherein the capstan-cleaning element abuts the capstan, or a head-cleaning configuration wherein the drive mechanism engages the capstan.

The drive mechanism of the cleaning cassette preferably includes a drivewheel, a first drivebelt, a terminal pulley, a carriage, and a cleaning head. The drivewheel is rotatably coupled to the housing and has a first pulley affixed thereto. The first drivebelt is engaged with the first pulley. The terminal pulley is rotatably attached to the housing and coupled to the first drivebelt. The terminal pulley has a cam eccentrically affixed thereto. The carriage is slidably coupled to the housing and engaged with the cam. The cleaning head is attached to the carriage and is for engaging and cleaning the head of the tape drive unit.

The drive mechanism preferably also includes a first intermediate pulley, a second intermediate pulley, and a second drivebelt, all between the first pulley and the terminal pulley. The first intermediate pulley is rotatably coupled to the housing and is engaged by the first drivebelt. The second intermediate pulley is fixedly attached and concentric with the first intermediate pulley. The second drivebelt is engaged by the second intermediate pulley, and also by the terminal pulley. Preferably, the first pulley has a diameter less than that of the first intermediate pulley. Also, the second intermediate pulley has a diameter less than that of the first intermediate pulley and less than that of the terminal pulley. This provides the advantage of speed reduction with high-speed drive units, such that the speed of the head-cleaning element is reduced for more effective cleaning.

The capstan cleaner of the cleaning cassette is preferably movably attached to the housing, and the drivewheel is rotatably attached to the capstan cleaner. The capstan-cleaning element is also attached to the capstan cleaner adjacent the drivewheel, such that the drivewheel and the capstan-cleaning element may be shifted forwardly or rearwardly relative to the housing by moving the capstan cleaner. Rearward shifting of the drivewheel thus causes the drivewheel to be disengaged from the capstan and the capstan-cleaning element to move forwardly to engage the capstan when the housing is inserted into the drive unit.

The preferred method of allowing for movement of the capstan cleaner is to have the capstan cleaner pivotally attached to the housing, such that rotation of the capstan cleaner in one direction places the drivewheel into engagement with the capstan and, likewise, rotation in the opposite direction places the capstan-cleaning element into engagement with the capstan.

The cleaning activation mechanism portion of the capstan cleaner includes an arm extending away from the pivotal attachment of the capstan cleaner to the housing. The arm includes a head for engagement with the housing in at least two positions. A first position holds the drivewheel in a forwardmost location for engagement with the capstan. A second position holds the capstan cleaning element in a forwardmost location for engagement with the capstan.

Also in the preferred embodiment of the invention, the carriage is both pivotally and slidably attached to the housing. The slidable attachment of the carriage to the housing allows the head cleaner to reciprocate laterally for back-and-forth cleaning of the drive unit head. Pivotal attachment of the carriage to the housing allows the head cleaner to move forwardly and rearwardly relative to the housing and to the head, such that irregular surface shapes of the head may be effectively cleaned.

The construction of the cleaning cassette as outlined above provides many advantages over prior art cleaning cassettes. The provision for drivebelts allows the cleaning cassette to operate with a reduced noise level, and also provides excellent speed reduction when combined with pulleys of differing relative sizes. The speed reduction is very advantageous with high-speed drive units allowing the head cleaner to effectively pass over and clean irregularly shaped read/write heads of drive units. The provision of a retractable capstan cleaner within the cleaning cassette is also advantageous over previous systems, since those systems did not provide for such cleaning when, as with the drive unit described herein, the capstan of the drive unit is the sole motive force in the drive unit. The activation system of the cleaning cassette allows the cassette to clean in two different modes, one for cleaning the head of the drive unit, and the other for cleaning the capstan. This also reduces the load on the drive unit by separately cleaning these elements such that no automatic shutoff mechanism is activated. Also, the provision for both head and capstan cleaning effectively cleans all elements of the drive unit that are contacted by a standard recording tape, which is typically used in the drive units.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
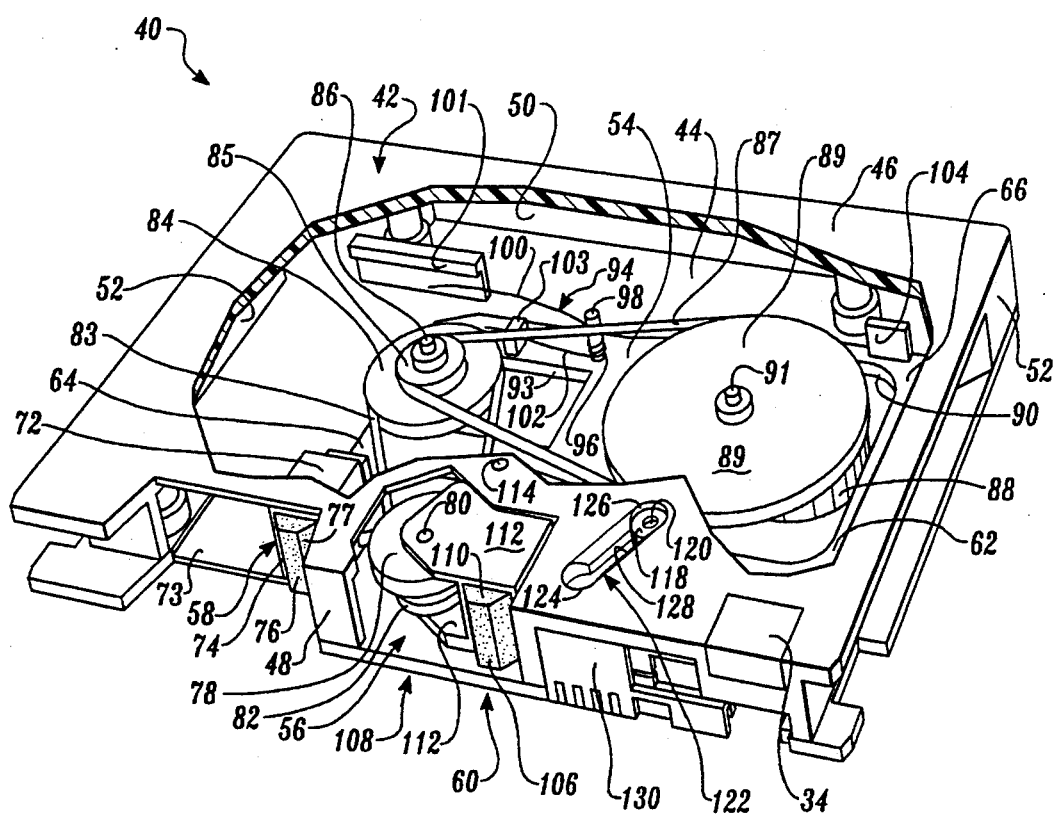
FIG. 1 is a perspective view of the cleaning cartridge of the invention shown with portions of the top wall cut away to see the inner workings of the cartridge.
Figure 2:
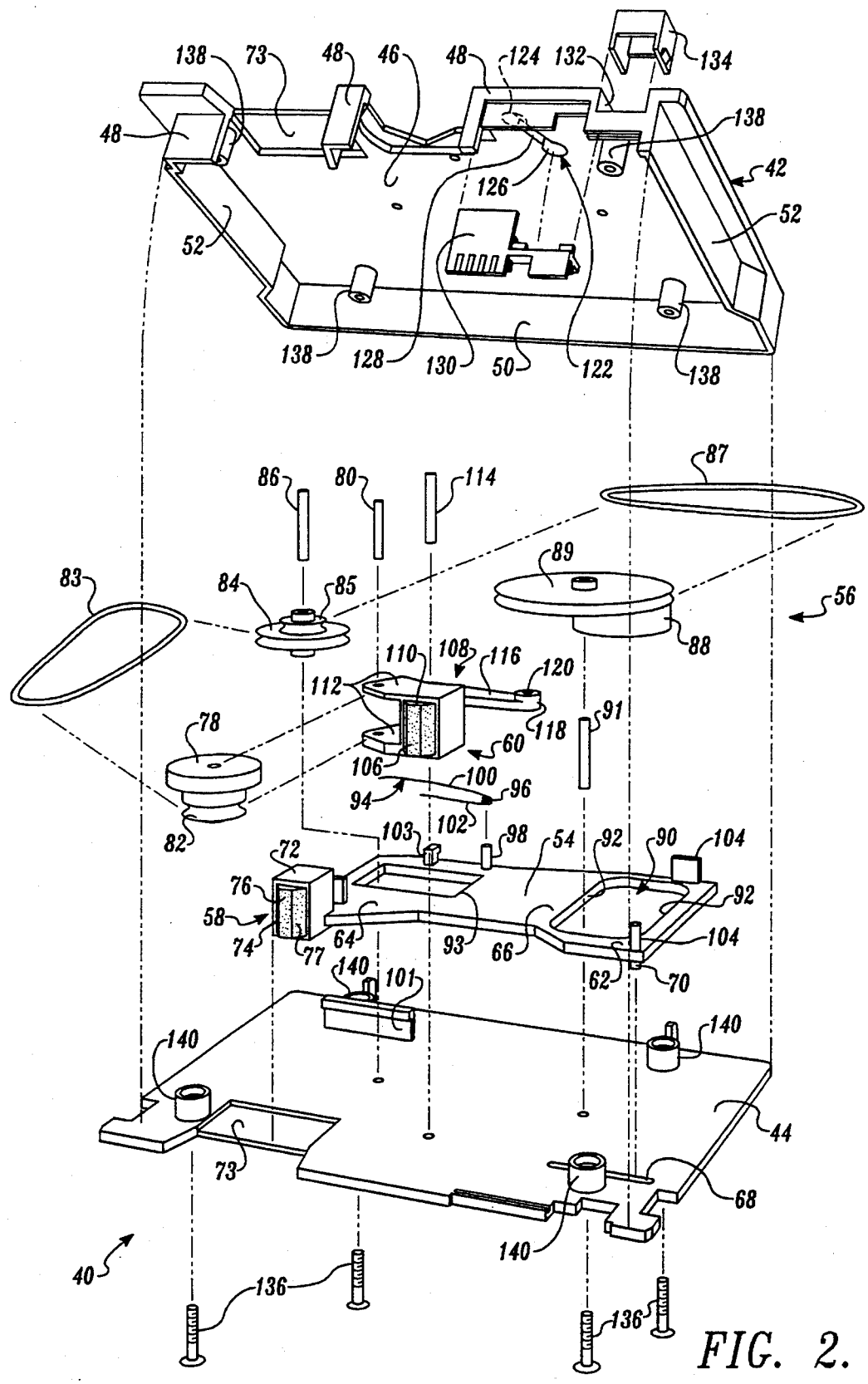
FIG. 2 is an exploded perspective view of the cartridge of FIG. 1.

Referring first to FIGS. 1 and 2, the components of a cleaning cartridge 40 of the present invention will first be described including all the parts and their interconnections. After a detailed discussion of the components of cleaning cartridge 40, FIGS. 3–5 will be referred to for a discussion of the cleaning modes of cleaning cartridge 40 and the interface with a tape drive unit to which cleaning cartridge 40 is preferably adapted.

Figure 3:
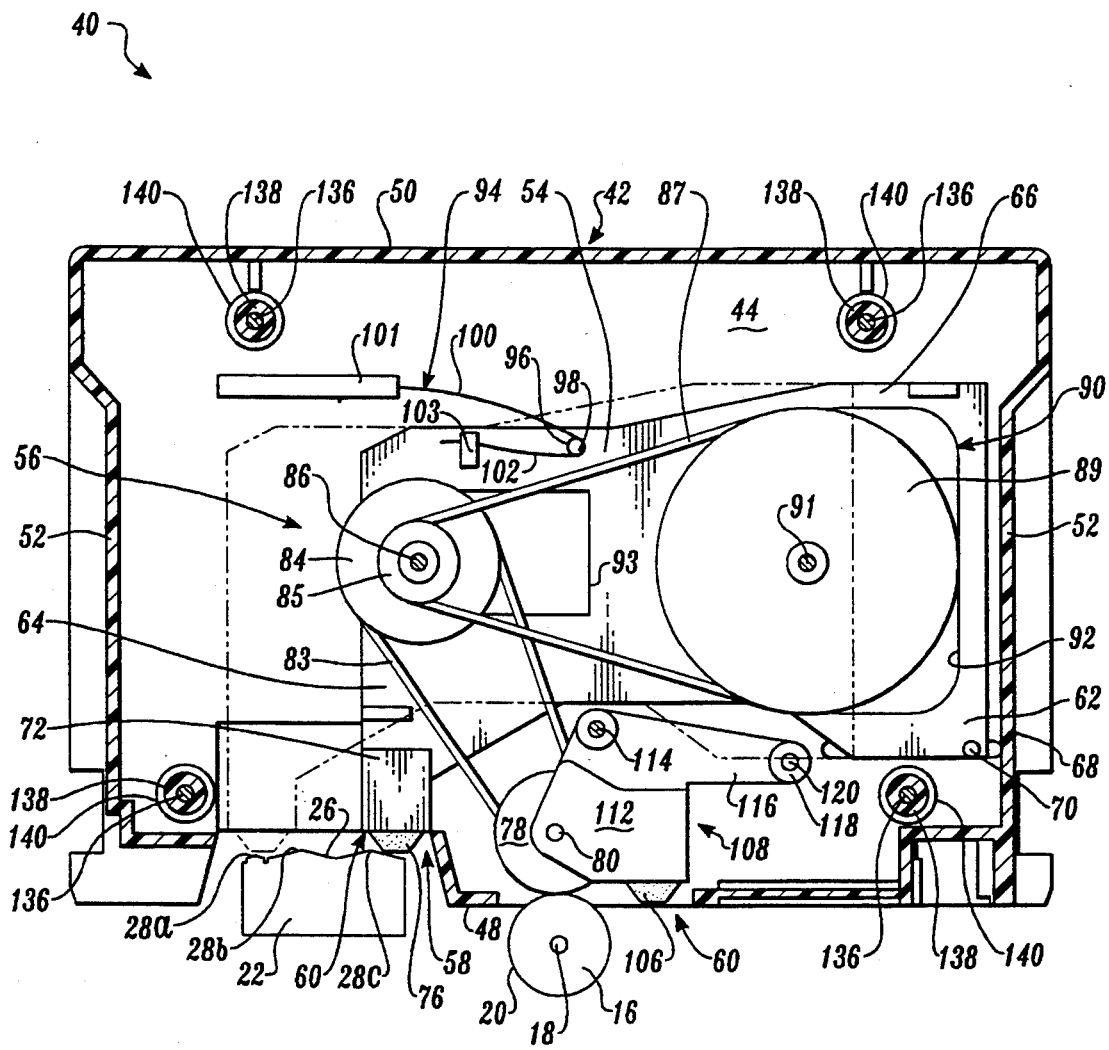
FIG. 3 is a plan view of the cartridge with the top wall removed, showing the cartridge in a head-cleaning configuration.
Figure 4:
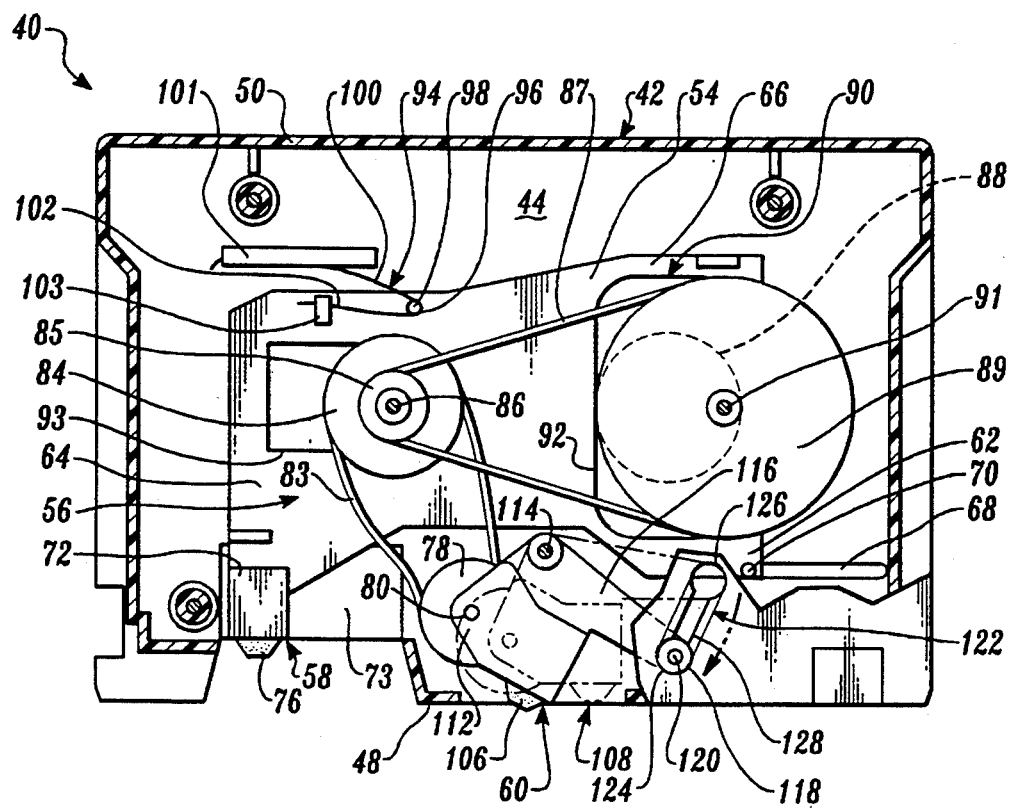
FIG. 4 is a plan view of the cartridge of the present invention showing the deactivation of the head-cleaning elements and the activation of the capstan-cleaning mechanism.
Figure 5:
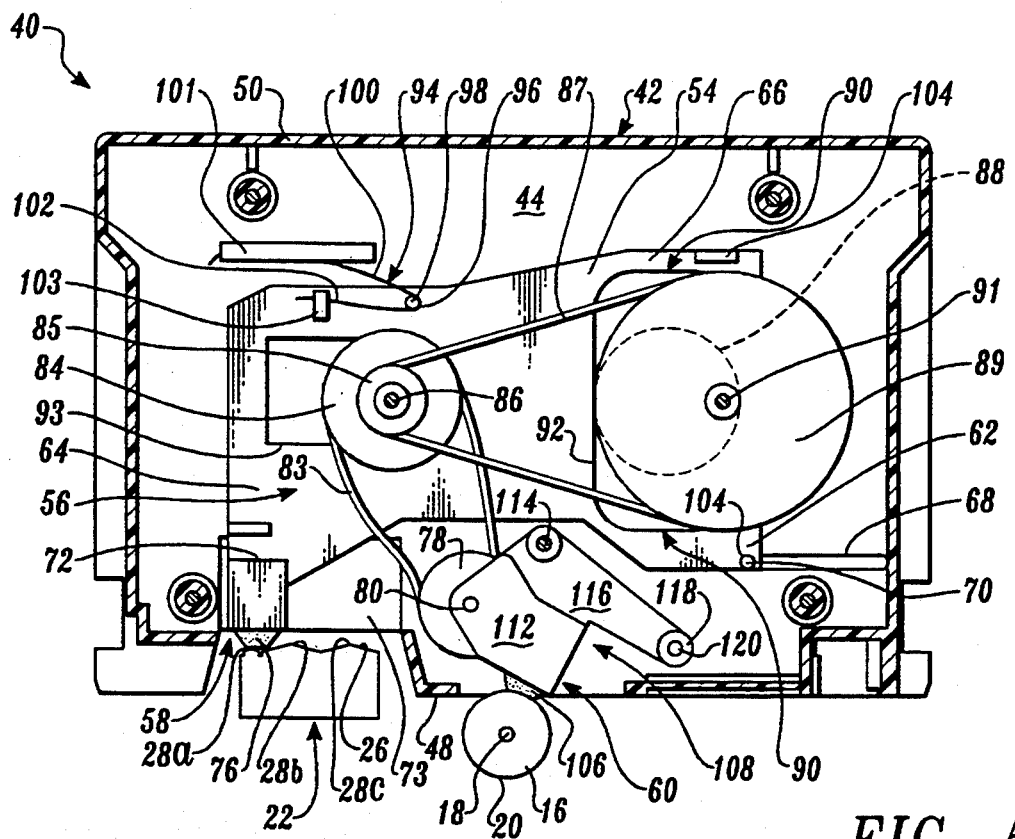
FIG. 5 is a plan view of the cartridge of the present invention showing a capstan of a drive unit being cleaned.

The preferred form of cleaning cartridge 40 is arranged and configured for use in a tape drive unit, such as that described above. The FIGURES herein show only those components of the tape drive unit that are directly relevant to the operation of the present invention. As illustrated in FIGS. 3–5, those components include a capstan 16, which is held on a shaft 18 and includes a cylindrical drive surface 20. The capstan 16 is generally in the form of a wheel that is driven by shaft 18. A read/write head 22 also interfaces with cleaning cassette 40. Basically, the tape drive unit comprises a structure that defines a generally rectangular containing area and that, in the normal operation of the unit, contains a prior art tape cassette, having a particular configuration to operate in this unit. The tape drive unit has a tape drive system that comprises capstan 16, which is located in the forward middle portion of the containing area and is mounted for rotation about shaft 18. This capstan has a cylindrical drive surface 20. In the usual operation of the unit, the drive surface 20 engages a circular drive element positioned within the magnetic tape cartridge, which, in turn, causes the travel of a drive ribbon that engages the tape on the two spools in the housing.

At the forward left-hand portion of the containing area, there is a read/write head 22 mounted to a carrying structure (not shown). This head 22 has a rearwardly facing operating surface 26 that is adapted to be in operating engagement with the magnetic tape. Operating surface 26 is typically formed with two vertically aligned and laterally spaced ridges 28 that protrude a short distance outward from operating surface 26. A third ridge 28 may also be provided on the leftmost side of operating surface 26 to provide erase or other functions. Read/write head 22 in this particular machine is made to move between a retracted position and an operating position when the magnetic tape cartridge is inserted into the drive unit. FIGS. 3 and 5 of this application show read/write head 22 in an operating position.

The drive unit also includes a control switch mechanism that interfaces with the front surface of a magnetic tape cartridge along the right side of the cartridge, as will be explained below. However, this switch mechanism is not particularly relevant to the present invention and, thus, is not illustrated.

It is to be understood that the tape drive unit and its components described above already exist in the prior art. The present invention is particularly adapted to operate in the tape drive unit to clean the operating surface 26 of the read/write head 22 and to clean the drive surface 20 of capstan 16.

The apparatus of the present invention is in the form of a cartridge 40 comprising a housing 42 having an overall rectangular configuration generally similar to that of a tape cassette normally used with the tape drive unit. More specifically, this housing 42 comprises a bottom wall 44, top wall 46, front wall 48, rear wall 50, and right and left sidewalls 52.

In describing the present invention, the cleaning cartridge 40 will be considered as having a forward portion, a rear portion, and first and second side portions, corresponding to the locations of the front wall 48, rear wall 50, and right and left sidewalls 52, respectively.

The main operating components of cartridge 40 are a carriage 54 mounted in the housing 42 for side-to-side motion, a drive transmission 56 arranged to engage capstan 16 to cause the side-to-side motion of carriage 54, a cleaning device 58 mounted to carriage 54 so as to provide cleaning engagement with operating surface 26 of the read/write head, and a capstan 16 pivotally mounted to housing 42 to come into cleaning engagement with capstan 16 and thereby disengage head cleaner 58.

To describe carriage 54 more specifically, carriage 54 has a generally planar plate-like configuration and rests on bottom wall 44. Carriage 54 has a left mounting end portion 62, a right cleaning end portion 64, and an intermediate drive-engaging portion 66.

The left mounting portion 62 of carriage 54 is formed with a laterally extending groove 68 to receive a downwardly extending pivot pin 70 connected to and extending downwardly from carriage 54. This groove-and-pin connection 68, 70 serves the function of locating fight mounting portion 62 of carriage 54, and also acts as a pivot location to permit limited fore-and-aft movement of left cleaning end portion 64 of carriage 54.

At the forward end of left end portion 64 of carriage 54, there is a rectangularly shaped cleaning member 72 that rides within a cleaning member recess 73 formed within bottom wall 44 and top wall 46 of housing 42. Recess 73 is rectangular in shape on both the top and bottom walls and provides the proper clearance for cleaning member 72 to slide between the walls. Recess 73 also may provide a rearward movement limit to cleaning member 72 as carriage 54 pivots about pin 70. Cleaning member 72 also defines a forwardly facing open recess 74 to receive therein a cleaning pad 76. Cleaning pad 76 extends a short distance beyond the forward edges of cleaning member 72 so as to be able to come into engagement with the operating surface 26 of read/write head 22. The forward surface of pad 76 has its side edges slanted, as at 77, at about a 45-degree angle from front wall 48, to enhance the cleaning action of pad 76 against head surface 26.

Drive transmission 56 comprises a drivewheel 78 positioned at the forward middle portion of housing 42 and mounted for rotation about its vertical axis by means of a pin 80 connected to capstan cleaner 60. Located below and fixedly connected to drivewheel 78 is a first pulley 82 of a relatively smaller diameter. Preferably, first pulley 82 is integrally formed with drivewheel 78. A first belt 83 is engaged about first pulley 82 and extends rearwardly and slightly to the left within housing 42 to engage a larger second pulley 84. Second pulley 84 is positioned rearwardly of first pulley 82 and is located slightly to the left of center midway between front wall 48 and rear wall 50. Second pulley 84 is mounted to a pin 86 in housing 42 for rotation about its vertical axis.

A third pulley 85 is located above and fixedly connected to second pulley 84. Preferably, third pulley 85 is integrally formed with second pulley 84. Third pulley 85 has a relatively smaller diameter than that of second pulley 84. Third pulley 85 is also mounted to pin 86 in housing 42 for rotation about its vertical axis. A second belt 87 is engaged with third pulley 85 and extends within housing 42 toward right sidewall 52. Second belt 87 engages fourth pulley 89, which is preferably relatively larger in diameter than any of the aforementioned pulleys. Fourth pulley 89 is mounted approximately midway between front wall 48 and rear wall 50 within the right side of housing 42. Fourth pulley 89 is mounted to a pin 91 in housing 42 for rotation about its vertical axis.

A cam 88 is located below and fixedly connected to fourth pulley 89. Cam 88 is cylindrical in shape and projects downwardly from one side of fourth pulley 89 beginning near an outer edge of fourth pulley 89 and spanning just past the vertical axis of fourth pulley 89. Thus, cam 88 is mounted eccentrically from pin 91 about which fourth pulley 89 rotates. This circular cam 88 fits within a cam slot 90 formed in the plate-like portion of carriage 54. Cam slot 90 has a longitudinal axis running parallel to sidewalls 52. More specifically, cam slot 90 is defined by two longitudinally aligned side edges 92 spaced from one another by a lateral distance just slightly larger than the diameter of circular cam 88. The forward and rearward ends of cam slot 90 are connected at the widest part to be separated by the distance of approximately the diameter of fourth pulley 89.

It is apparent from the construction described above that carriage 54 reciprocates in a side-to-side fashion in directions parallel to front wall 48 and rear wall 50 as cam 88 acts against side edges 92. Therefore, to allow for free movement without interference of second pulley 84 and pin 86 with carriage 54, a clearance slot is provided in the plate portion of carriage 54. Clearance slot 93 is rectangular and provides clearance both in right and left directions, as well as fore and aft, since some pivotal movement about slide pin 70 is allowed.

A spring 94 is also provided and attached to carriage 54 to bias carriage 54 and, thus, head cleaner 58, in a forward direction near front wall 48. Spring 94 includes loops 96 that are slid over a vertical upright pin 98 near the middle of the rearward edge of carriage 54. A first spring arm 100 projects slightly rearwardly and to the left of pin 98. First spring arm 100 has a slight curvature and contacts a detent wall 101 on the rearward side of the curvature. Detent wall 101 is positioned in the left rearward corner of housing 42 and extends integrally upward from bottom wall 44 of housing 42. Detent wall 101 has an inverted L-shaped cross section such that first arm 100 is not likely to become disengaged from detent wall 101. The longitudinal direction of detent wall 101 is generally parallel with rear wall 50. Thus, as carriage 54 reciprocates, first spring arm 100 biases the left side of carriage 54 in a forward direction such that head cleaner 58 is forced against head surface 26. A second spring arm 102 is provided extending from the opposite side of pin 98. A spring detent 103 preferably engages second arm 102 to the left of pin 98. Spring detent 103 is generally L shaped in an inverted fashion and extends integrally upward from carriage 54.

Locating projections 104 are also provided on carriage 54 to maintain the vertical positioning of carriage 54 relative to housing 42. The first locating projection 104 projects from the rearward right corner of the plate portion of carriage 54 and a second locating projection extends above slide pin 70 at the forward right corner of carriage 54. Pin 98, as well as cleaning member 72, also act as vertical locators for carriage 54 between top wall 46 and bottom wall 44.

The elements of a cleaning activation mechanism 108 and a capstan cleaner, including a capstan cleaner pad 106, will now be described. Cleaning activation mechanism 108 is preferably constructed as an integrally injection-molded piece that includes a rectangular pad recess 110 to hold a capstan-cleaning pad 106. Capstan-cleaning pad 106 is preferably substantially the same as head-cleaning pad 76. Capstan-cleaning pad 106 fits within pad recess 110, which opens toward the front of housing 42. Cleaning activation mechanism 108 forms an open box shape to form pad recess 110. On the left side of this box-like pad recess 110, two wheel-mounting arms project parallel to bottom wall 44 and top wall 46. Wheel-mounting arms 112 include holes through which pin 80 secures drivewheel 78 and first pulley 82. The lowermost of wheel mounting arms 112 lies flat against-,.a forward portion of bottom wall 44, centrally from left to right. The uppermost of wheel-mounting arms 112, along with pad recess 110, projects through a recess cut within top wall 46 of housing 42 such that the upper surfaces of these portions of cleaning activation mechanism 108 are flush with the top surface of top wall 46. A clearance recess is also provided for drivewheel 78 within top wall 46. A switch arm 116 projects from the rearward side of the recess and uppermost wheel-mounting arm to form an extended portion of capstan cleaner 60 and cleaning activation mechanism 108. The rearwardmost portion of switch arm 116 includes a bore to receive a pivot pin 114. Pivot pin 114 is secured to housing 42 and is oriented vertically to allow cleaning activation mechanism 108 to pivot horizontally about pivot pin 114. Switch arm 116 extends to the right of pivot pin 114 to a position nearly directly in front of fourth pulley 89. The position of switch arm 116 is slightly lower than that of the top surface of capstan cleaner 60, such that it rides beneath top wall 46.

A switch head 118 is formed on the end of switch arm 116. Switch head 118 is cylindrical in shape, with a vertical bore 120 through its center. Switch head 118 projects slightly upwardly from switch arm 116. A switch slot 122 is provided within top wall 46 of housing 42 to receive switch head 118. Switch slot 122 includes a forward end portion, which is a circular bore only slightly larger than the diameter of switch head 118. Switch slot 122 also includes a rearward end portion 126 and a slot neck 128 between the two end portions. Rearward end portion 126 is positioned rearwardly and slightly to the right of forward end portion 124 and is similar to forward end portion 124 in that it is a circular bore slightly larger than the diameter of switch head 118. Slot neck 128 bridges forward end portion 124 and rearward end portion 126. Slot neck 128 thus extends rearwardly and slightly to the right generally along an axis connecting the centers of forward end portion 124 and rearward end portion 126. The width of slot neck 128 is slightly larger than bore 120. Slot neck 128 also includes angled portions that form slopes toward the neck opening between the end portions. These angled portions are approximately 45 degrees from the surface of top wall 46.

Switch slot 122, in combination with switch head 118 and switch arm 116, allows cleaning activation mechanism 108 to be pivoted about pivot pin 114. Such movement and action will be described in further detail below in connection with a discussion of the use of capstan cleaner 60 and cleaning activation mechanism 108, as shown in FIGS. 4 and 5.

Also illustrated in FIGS. 1 and 2 is a locating device 130 used for compatibility purposes with tape drive units. Frequently, switches are located in the drive units for indicating whether or not a particular magnetic tape can be recorded, erased, et cetera. Locating device 130 is attached to the forward fight side of housing 42 and attached to be slidably engaged to front wall 48 for movement to the right or the left, as desired, to open or close certain recesses within front wall 48. A recess 132 is also provided in the forward right portion of housing 42 for the same purposes. A block 134 is also held within recess 132 and is removable to provide compatibility with different tape drive units.

FIG. 2 shows assembly screws 136 that project up through bottom wall 44 of housing 42. Screw-receiving posts 138 are integrally secured to top wall 46 of housing 42 to be aligned with screws 136 and locating cylinders 140 are integrally formed with bottom wall 44. Screws 136 extend through locating cylinders 140 and into screw-receiving posts 138 to secure housing 42 together around all cleaning components, pulleys, belts, and other elements. Preferably, four screws 136, four screw-receiving posts 138, and four locating cylinders 140 are used near each of the corners of housing 42.

Referring now to FIG. 3, the operation of head cleaner 58 will now be described. Once cleaning cartridge 40 is inserted into a tape drive unit with read/write head 22 in an operating position and with capstan 16 abutting drivewheel 78, cleaning is ready to begin. Drivewheel 78 is placed in a position to abut capstan 16 when switch head 118 is in a rearward position within rearward end portion 126 of switch slot 122 (as shown in FIG. 1). This position not only causes frictional engagement between drive surface 20 of capstan 16 with drivewheel 78, but also causes first belt 83 to be in tight engagement between first pulley 82 and second pulley 84. Second belt 87 is preferably constantly in tight engagement between third pulley 85 and fourth pulley 89. As drivewheel 78 is turned by capstan 16, first pulley 82 moves first belt 83 such that second pulley 84 and third pulley 85 are rotated. The rotation of third pulley 85 causes second belt 87 to turn and rotate fourth pulley 89 about pin 91. Since cam 88 is integrally molded and projects downwardly from fourth pulley 89, cam 88, being eccentrically mounted, acts against side edges 92 of cam slot 90 in carriage 54 to move carriage 54 side to side in a reciprocating fashion. Carriage 54 is guided by slide pin 70 within groove 68 and also by spring 94 acting between pin 98 and detent wall 101. Excessive forward pivotal movement of carriage 52, particularly at head cleaner 16, is countered by contact of the forward side of carriage 54 against pin 114. Typically, however, the engagement of cleaning pad 76 against operating surface 26 of read/write head 22 holds carriage 54 from direct contact with pin 114. Thus, pad 76 is allowed to ride along the contours of operating surface 26 to clean the entire operating surface 26 without hang-ups. The speed reduction that is carried out by drive transmission 56's having relatively differently sized pulleys also allows cleaning member 72 to operate at a slower speed so that it does not skip over low areas of operating surface 26. Typical drive units operate at very high speeds and the gear reduction integrated into drive transmission 56 becomes very advantageous. Also, the belt drive system of drive transmission 56 significantly reduces noise, such as chattering of cleaning cartridge 40, while in operation.

As carriage 54 reciprocates, clearance slot 93 ensures that no interference between pin 86 and carriage 54 occurs.

FIG. 3 illustrates the fightwardmost position of carriage 54. In this position, cam 88 (hidden beneath fourth pulley 89) is in a rightwardmost position such that cam slot 90 pulls carriage 54 to the fight. The phantom view of carriage 54 and head cleaner 58 shows the leftmost position after cam 88 has rotated 180 degrees about pin 91.

FIGS. 4 and 5 illustrate the use of cleaning activation mechanism 108 and capstan cleaner 60. Cleaner 60 and mechanism 108 are really one and the same in that activation mechanism 108 selectively activates or deactivates head cleaner 58 while deactivating or activating capstan cleaner 60. Thus, when capstan cleaner 60 is activated, head cleaner 58 is deactivated. This arrangement provides reduced friction on capstan 16 such that any automatic shutoff mechanisms are not activated in the drive unit. This arrangement is also advantageous, since access to capstan 16 for cleaning may be hindered when capstan 16 is used to drive head cleaner 58.

Cleaning cartridge 40 is changed from a head-cleaning configuration to a capstan-cleaning configuration by inserting an instrument, such as a pen or pencil, into bore 120 of switch head 118, pressing downwardly and forwardly with the instrument, such that switch head 118 is moved beneath the lower surface of top wall 46 with resilient bending of switch arm 116. Switch head 118 is then shifted beneath slot neck 128 and allowed to pop up within forward end portion 124. This movement pivots cleaning activation mechanism 108 about pin 114 such that first drivewheel 78, which is positioned to the left of pin 114, is moved closer to second pulley 84 to allow first belt 83 to go slack. This also moves first drivewheel 78 out of engagement with drive surface 20 of capstan 16. Thus, carriage 54 is not reciprocated by drive transmission 56.

However, capstan-cleaning pad 106 is also moved forwardly and cleaning cassette 40 is then ready to be inserted within the drive unit such that capstan-cleaning pad 106 will abut drive surface 20 of capstan 16, as shown in FIG. 5. In this position, pad 106 is compressed against drive surface 20 such that, as capstan 16 rotates about shaft 18, cleaning of drive surface 20 occurs. A cleaning solution, such as a hydrocarbon solution, may be applied to pad 106 to improve the cleaning ability. Foreign matter and glazing of drive surface 20 are thus corrected with cleaning cartridge 40 and cleaning activation mechanism 108 pivoted into this position.

The advantages to cleaning cartridge 40 of the present invention are numerous, some of which have been discussed above. The belt drive system of drive transmission 56 allows for significant speed reduction for slower movement of head cleaner 58 with high-speed drives that are typically in use. Also, with high-speed drives, noise can be a serious problem, which drive transmission 56 helps to solve by using first and second belts 83 and 87. Also, the arrangement of cleaning cartridge 40, such that all elements that contact a prior art cartridge tape can be cleaned, provides significant advantages. Foreign matter and magnetic particle buildup are prevalent on all areas that contact elements of the drive unit. These elements typically include drive surface 20 of capstan 16 and operating surface 26, including all crevices and valleys between ridges 28 of read/write head 22. Thus, cleaning cartridge 40 of the present invention cleans all of these areas effectively without excess load on the drive unit. All of these advantages are also provided with a self-contained system. The cleaning activation mechanism 108 allows selection of one cleaning mode or the other, with a retraction of the one causing an activation of the other.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for cleaning a tape drive unit having a capstan and a read/write head, comprising:
    (a) a housing arranged and configured to be received within the unit, said housing having a forward side opposing the capstan and head and a rearward side opposite the forward side;
    (b) a reciprocating head cleaner coupled within said housing, said head cleaner including a drive mechanism engageable with the capstan of the unit; and
    (c) a capstan cleaner engageable with the capstan of the unit to clean the capstan, said capstan cleaner including a capstan-cleaning element and a cleaning activation mechanism for selecting a capstan-cleaning configuration, wherein said capstan-cleaning element abuts the capstan, or a head-cleaning configuration, wherein said drive mechanism engages the capstan to reciprocate the head cleaner; said cleaning activation mechanism being structurally coupled to said housing and wherein said cleaning activation mechanism moves said capstan-cleaning element toward and away from said capstan.

2. The apparatus of claim 1, wherein said drive mechanism includes:
    (a) a drivewheel rotatably coupled to said housing and having a first pulley affixed thereto;
    (b) a first drivebelt engaged with said first pulley;
    (c) a terminal pulley rotatably attached to said housing and coupled to said first drivebelt, said terminal pulley having a cam eccentrically affixed thereto;
    (d) a carriage slidably coupled to said housing and engaged with said cam; and
    (e) a cleaning head attached to said carriage for engaging the head of the tape drive unit.

3. The apparatus of claim 2, wherein said drive mechanism further comprises:
    (a) a first intermediate pulley rotatably coupled to said housing and engaged by said first drivebelt;
    (b) a second intermediate pulley fixedly attached to said first intermediate pulley concentric with said first intermediate pulley; and
    (c) a second drivebelt engaged by said second intermediate pulley and engaged by said terminal pulley.

4. The apparatus of claim 3, wherein said first pulley has a diameter less than that of said first intermediate pulley, and wherein said second intermediate pulley has a diameter less than that of said first intermediate pulley and less than that of said terminal pulley.

5. The apparatus of claim 3, wherein said capstan cleaner is movably attached to said housing and wherein said drivewheel is rotatably attached to said capstan cleaner, and said capstan-cleaning element is attached to said capstan cleaner adjacent said drivewheel such that said drivewheel and said capstan-cleaning element may be shifted forwardly or rearwardly relative to said housing by moving said capstan cleaner, rearward shifting of said drivewheel causing said drivewheel to be disengaged from the capstan and said capstan-cleaning element to move forwardly to engage the capstan when the housing is inserted into the drive unit.

6. The apparatus of claim 5, wherein said capstan cleaner is pivotally attached to said housing such that rotation of said capstan cleaner in one direction places said drivewheel into engagement with the capstan and rotation in the opposite direction places said capstan-cleaning element into engagement with the capstan.

7. The apparatus of claim 6, wherein said cleaning activation mechanism includes an arm extending away from the pivotal attachment of said capstan cleaner, said arm including a head for engagement with said housing in at least two positions, a first position for holding said drivewheel in a forwardmost location for engagement with the capstan and a second position for holding said capstan-cleaning element in a forwardmost location for engagement with the capstan.

8. The apparatus of claim 1, wherein said capstan cleaner is movably attached to said housing and wherein said drive mechanism is rotatably attached to said capstan cleaner, and said capstan-cleaning element is attached to said capstan cleaner adjacent said drive mechanism such that at least a portion of said first drive mechanism and said capstan-cleaning element may be shifted forwardly or rearwardly relative to said housing by moving said capstan cleaner, forward shifting of said capstan-cleaning element causing said drive mechanism to be disengaged from the capstan and said capstan-cleaning element to engage the capstan when the housing is inserted into the drive unit.

9. The apparatus of claim 8, wherein said capstan cleaner is pivotally attached to said housing such that rotation of said capstan cleaner in one direction places said drive mechanism into engagement with the capstan and rotation in the opposite direction places said capstan-cleaning element into engagement with the capstan.

10. The apparatus of claim 9, wherein said cleaning activation mechanism includes an arm extending away from the pivotal attachment of said capstan cleaner, said arm including a head for engagement with said housing in at least two positions, a first position for engagement of said drive mechanism with the capstan and a second position for holding said capstan-cleaning element in a forwardmost location for engagement with the capstan.

11. An apparatus for cleaning a tape drive unit having a capstan and a head, comprising:
(a) a housing arranged and configured to be received within the unit;
(b) a reciprocating head cleaner coupled within said housing, said head cleaner including a drive mechanism engageable with the capstan of the tape drive unit; and
(c) a capstan cleaner retractably coupled within said housing, said capstan cleaner being engageable with the capstan of the tape drive unit and being retractable rearwardly within said housing for disengagement from the capstan.

12. The apparatus of claim 11, wherein said drive mechanism includes a drivewheel rotatably mounted to said capstan cleaner, retraction of said capstan cleaner causing said drivewheel to engage the capstan, and retraction of the drivewheel causing said capstan cleaner to engage the capstan.

13. The apparatus of claim 12, wherein said capstan cleaner is pivotally mounted to said housing, said capstan cleaner including an arm formed integrally therewith, movement of said arm causing pivotal movement of said capstan cleaner for selectively engaging or disengaging said drivewheel and said capstan cleaner with the capstan.

14. The apparatus of claim 13, wherein said arm of said capstan cleaner includes a head at the end thereof, said housing including a slot for receiving said head in at least two positions, a first position for engagement of said cleaner with the capstan and a second position for engagement of said wheel with said capstan.

15. The apparatus of claim 12, wherein said drive further includes a first pulley affixed to said drivewheel; a first drivebelt engaged with said first pulley, retraction of said drivewheel causing said first drivebelt to be in loose engagement with said first pulley; a terminal pulley rotatably attached to said housing and coupled to said first drivebelt, said terminal pulley having a cam eccentrically affixed thereto; a carriage slidably coupled to said housing and engaged with said cam; and a cleaning head attached to said carriage for engaging the head of the tape drive unit.

16. An apparatus for cleaning a tape drive unit having a capstan and a head, comprising:
(a) a housing arranged and configured to be received within the drive unit; and
(b) a reciprocating head cleaner coupled within said housing, said head cleaner including a drive mechanism engageable with the capstan of the drive unit, said drive mechanism including:
(i) a first drivewheel rotatably coupled to said housing and having a first pulley affixed thereto;
(ii) a first drivebelt engaged with said first pulley;
(iii) a terminal pulley rotatably attached to said housing and coupled to said first drivebelt, said terminal pulley having a cam eccentrically affixed thereto;
(iv) a carriage slidably coupled to said housing and engaged with said cam; and
(v) a cleaning head attached to said carriage for engaging the head of the tape drive unit.

17. The apparatus of claim 16, further including a capstan cleaner engageable with the capstan of the drive unit coupled to said housing, said capstan cleaner including a capstan-cleaning element and a cleaning activation mechanism for selecting a capstan-cleaning configuration, wherein said capstan-cleaning element abuts the capstan, or a head-cleaning configuration, wherein said drive mechanism engages the capstan.

18. The apparatus of claim 17, wherein said capstan cleaner is movably attached to said housing and wherein said drivewheel is rotatably attached to said capstan cleaner, and said capstan-cleaning element is attached to said capstan cleaner adjacent said drivewheel such that said drivewheel and said capstan-cleaning element may be shifted forwardly or rearwardly relative to said housing by moving said capstan cleaner, rearward shifting of said drivewheel causing said drivewheel to be disengaged from the capstan and said capstan-cleaning element to move forwardly to engage the capstan when the housing is inserted into the drive unit.

19. A cleaning cassette for cleaning a tape drive unit having a capstan and a head, comprising:
(a) a housing arranged and configured to be received within the drive unit;
(b) a reciprocating head cleaner coupled within said housing, said head cleaner including a drive means engageable by the capstan of the drive unit for producing reciprocating motion of said head cleaner; and
(c) a capstan cleaner engageable with the capstan of the drive unit and coupled to said housing, said capstan cleaner including a cleaning activation means for selecting capstan cleaner activation or head cleaner activation wherein said cleaning activation means is structurally connected to said housing and moves said capstan cleaner toward and away from said capstan.

20. The cleaning cassette of claim 19, wherein said drive means includes a drivewheel rotatably attached to said capstan cleaner and wherein said cleaning activation means includes a pivotal attachment of said capstan cleaner to said housing and an arm for pivoting said capstan cleaner, said arm having at least two positions relative to said housing, a first position for engagement of said capstan cleaner with the capstan and a second position for engagement of said drivewheel with said capstan.

* * * * *

UNITED STATES PATENT AND TRADEMARK OFFICE
CERTIFICATE OF CORRECTION

PATENT NO. : 5,420,737         Page 1 of 2
DATED      : May 30, 1995
INVENTOR(S) : E. Clausen It is certified that error appears in the above-indentified patent and that said Letters Patent is hereby corrected as shown below:

| COLUMN | LINE | |
|---|---|---|
| 2 | 38 | "carder" should read --carrier-- |
| 2 | 44 | "pans" should read --parts-- |
| 2 | 67 | "protrade" should read --protrude-- |
| 6 | 63 | "fight" should read --right-- |
| 7 | 20 | "fight" should read --right-- |
| 8 | 39 | "comer" should read --corner-- |
| 9 | 9-10 | "against-,.a" should read --against a-- |
| 9 | 67 | "fight" should read --right-- |
| 10 | 17 | "comers" should read --corners-- |
| 10 | 64 | "fightwardmost" should read --rightwardmost-- |
| 14 (Claim 14, | 5 line 5) | "said cleaner" should read --said capstan cleaner-- |

UNITED STATES PATENT AND TRADEMARK OFFICE
CERTIFICATE OF CORRECTION

PATENT NO. : 5,420,737
DATED : May 30, 1995
INVENTOR(S) : E. Clausen

It is certified that error appears in the above-indentified patent and that said Letters Patent is hereby corrected as shown below:

| COLUMN | LINE | |
|---|---|---|
| 14 | 6 | "wheel" should read -- drivewheel-- |
| 14 | 7-8 | "drive further" should read --drive mechanism further-- |

Signed and Sealed this

Seventeenth Day of October, 1995

Attest:

BRUCE LEHMAN

*Attesting Officer*  *Commissioner of Patents and Trademarks*